United States Patent
Doherty et al.

(10) Patent No.: US 7,876,713 B2
(45) Date of Patent: Jan. 25, 2011

(54) LABEL SWITCHED ROUTING IN SAS EXPANDERS

(75) Inventors: Terrence R. Doherty, Costa Mesa, CA (US); Carl Joseph Mies, Costa Mesa, CA (US); Bruce Gregory Warren, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 440 days.

(21) Appl. No.: 11/823,995

(22) Filed: Jun. 29, 2007

(65) Prior Publication Data
US 2009/0006697 A1    Jan. 1, 2009

(51) Int. Cl.
- H04L 12/28 (2006.01)
- H04L 12/56 (2006.01)
- G06F 15/173 (2006.01)
- G06F 3/00 (2006.01)
- G06F 13/42 (2006.01)
- G06F 12/00 (2006.01)

(52) U.S. Cl. .............. 370/256; 370/392; 370/408; 709/238; 709/252; 710/2; 710/106; 711/114

(58) Field of Classification Search ......... 370/389–392, 370/400, 230, 256–257; 710/2–3, 101, 106; 709/238, 252; 711/111–114
See application file for complete search history.

(56) References Cited

U.S. PATENT DOCUMENTS

| | | | | |
|---|---|---|---|---|
| 7,376,147 B2* | 5/2008 | Seto et al. | | 370/465 |
| 2004/0165601 A1* | 8/2004 | Liu et al. | | 370/401 |
| 2004/0205259 A1* | 10/2004 | Galloway | | 710/3 |
| 2005/0080881 A1* | 4/2005 | Voorhees et al. | | 709/220 |
| 2005/0125490 A1* | 6/2005 | Ramia | | 709/202 |
| 2005/0125574 A1* | 6/2005 | Foster et al. | | 710/36 |
| 2005/0138191 A1* | 6/2005 | Seto et al. | | 709/230 |
| 2006/0002304 A1* | 1/2006 | Ashwood-Smith | | 370/238 |
| 2006/0002385 A1* | 1/2006 | Johnsen et al. | | 370/389 |
| 2006/0008273 A1* | 1/2006 | Xue et al. | | 398/51 |
| 2007/0214303 A1* | 9/2007 | Bashford et al. | | 710/314 |

OTHER PUBLICATIONS

E. Rosen et al., RFC: 3032—MPLS Label Stack Encoding, Jan. 2001, The Internet Society (2001), pp. 1-20.*
Claudio DeSanti et al., "Tagged Frame Specification", Tagged Frame, SPEC., T11/03-35v0, May 2003, pp. 1-4.
Eric C. Rosen et al., "A Proposed Architecture for MPLS", Network Working Group, Internet Draft (draft-ietf-mpls-arch-00.txt), Aug. 1997, 59 pages.

* cited by examiner

Primary Examiner—Alpus H Hsu
Assistant Examiner—Jeremy Costin
(74) Attorney, Agent, or Firm—Morrison & Foerster LLP (57) ABSTRACT

The attaching of labels to an OPEN frame and applying label switched routing to SAS expanders is disclosed to eliminate the need for large routing tables in SAS networks. A label stack is inserted into the OPEN frame by the initiator, prior to the OPEN frame being transmitted. Each label contains the egress port for a SAS expander in the transmit path. Each SAS expander to be participating in the connection reads the labels to determine the egress port to connect to and through which data is to be sent. The SAS expander marks its label invalid or discards it and forwards the OPEN frame to the egress port where the next SAS expander will look for the first valid label. The process repeats until the OPEN frame reaches the edge device, at which time all labels are discarded and the OPEN frame is forwarded to the end device.

38 Claims, 6 Drawing Sheets

LABEL SWITCHED ROUTING IN SAS EXPANDERS

FIELD OF THE INVENTION

This invention relates to Serial Attached Small Computer System Interface (SAS) expanders, and more particularly to label switched routing in SAS expanders.

BACKGROUND OF THE INVENTION

Figure 1:
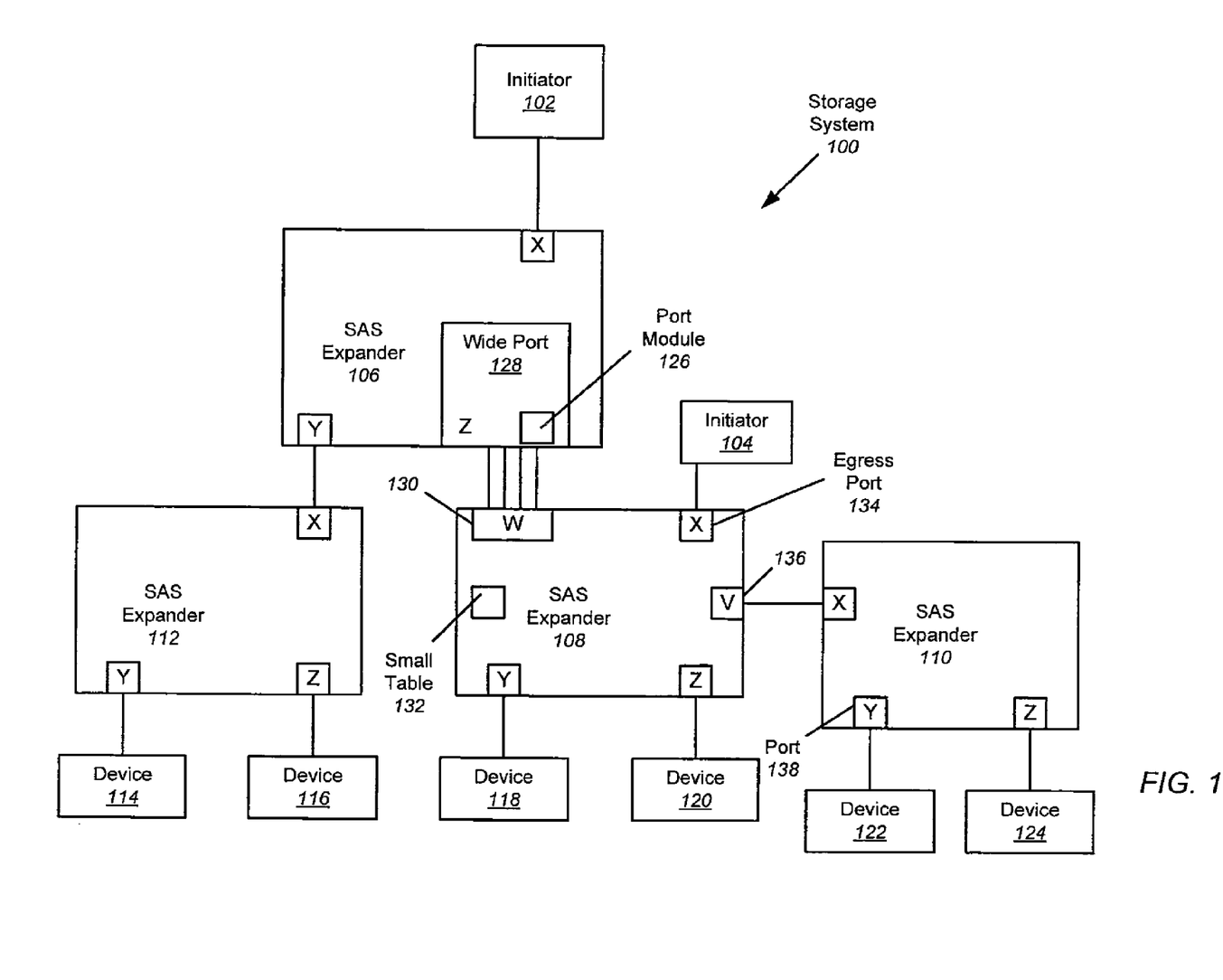
FIG. 1 illustrates an exemplary storage system including initiators, SAS expanders, and devices.

FIG. 1 illustrates an exemplary storage system 100 including initiators 102 and 104, SAS expanders 106, 108, 110 and 112, and devices 114, 116, 118, 120, 122 and 124. Note that FIG. 1 is merely illustrative, and that in SAS, SAS expanders can be connected in an arbitrary fashion, and a tree topology can be formed. If FIG. 1 represents a conventional SAS-1.1 network, then SAS expander 106 is a so-called "fanout" SAS expander, and SAS expanders 108, 110 and 112 may be so-called "edge" SAS expanders. In SAS-1.1, both fanout SAS expanders and edge SAS expanders can be connected to another expander by a "wide" port having multiple connections. In the example of FIG. 1, wide port 128 on fanout expander 106 is connected to wide port 130 on edge expander 108. Fanout expander 106 includes port module 126 which decides which of the multiple connections in the wide port is to be used for communicating data.

Fanout SAS expanders and edge SAS expanders generally represent two different designs, and serve different purposes. Fanout SAS expanders can be attached to multiple other SAS expanders, and are typically used higher up in the tree topology. On the other hand, edge SAS expanders are typically used further down the tree topology, are typically connected directly to end devices such as disk drives, and can be attached only to one other SAS expander.

Edge SAS expanders use subtractive routing, which means that small table is used to determine how to route a request. Edge SAS expanders are designed to be lower cost than fanout SAS expanders, and a small table is generally less expensive to maintain than a large table. In edge SAS expander 108, for example, if an OPEN frame (a request) for initiator 104 is received, small table 132 will indicate that initiator 104 is attached to egress port 134 having a label of X, and thus a connection can be formed with the initiator. However, if an OPEN frame for initiator 102 is received from devices 118 or 120 or edge SAS expander 110, small table 132 will not have an egress port for that initiator, and thus the request will be passed up to fanout SAS expander 106 through port 130. In fact, any OPEN frame which does not match any entries in small table 132 will be passed to port 130, hence the designation of subtractive routing. Note that OPEN frames are a SAS construct, and contain source and destination addresses, among other things.

Fanout SAS expanders are generally more expensive and have more functionality than edge SAS expanders. Fanout edge expanders need a large table of all devices in the system (e.g. a table with a separate listing for up to 128^2 devices). This large table, which may be an expensive content-addressable memory (CAM) or lookup table, is needed because of the decision made by the original architects of SAS to use world-wide names (WWNs) as the address of a device. Because the SAS network has no control over the assignment of these addresses, there is no way to control the assignment of addresses to create a sensible addressing scheme with shortcuts to limit the size of lookup tables, and therefore the use of large, complicated lookup tables or CAMs is required. As a result of the SAS addressing scheme, the 64-bit address of each device that the SAS expander is aware of must be placed in the lookup table or memory in order to identify the port on which the device resides. If an OPEN frame is received by a fanout SAS expander, the destination address contained within the frame is extracted and applied to the table, and the table returns a value, identifier or label indicating the port through which the data should be sent.

SAS-1.1 may soon be replaced by SAS-2. In SAS-2, there will be no separate fanout SAS expander and edge SAS expander designs. All expanders will have fanout SAS expander capabilities. However, because only fanout SAS expanders will be utilized, and because there can be many more devices present within a SAS-2 network, the size of the lookup tables or CAMs will be greatly increased.

Therefore, there is a need for a more efficient way to establish a connection when an OPEN frame is received, rather than relying on a large table in a fanout SAS expander.

SUMMARY OF THE INVENTION

Embodiments of the invention eliminate the need to maintain a large address table in SAS expanders by attaching labels to the OPEN frame and applying label switched routing to SAS expanders. A stack of labels is inserted into the OPEN frame by the initiator, prior to the OPEN frame being transmitted to a SAS expander. Each label contains the egress port for a SAS expander in the transmit path. Each SAS expander to be participating in the connection will read the labels in the OPEN frames to determine the egress port to connect to and through which data is to be sent. The SAS expander marks its label invalid or discards it and forwards the OPEN frame to the egress port where the next SAS expander will look for the first valid label. The process repeats until the OPEN frame reaches the edge device, at which time all labels are discarded and the OPEN frame is forwarded to the end device.

This scheme suits SAS particularly well, because SAS initiators are aware of the topology because of the SAS discovery process. As such, the initiator can create a table of labels identifying the network path to each device in the system. When an initiator wishes to establish a circuit or connection to a device, it inserts the label stack into the OPEN frame. This requires very little overhead in a SAS initiator because it already maintains all necessary information.

Embodiments of invention eliminate the need for extensive CAMs or lookup tables, reduce routing resources required for SAS expanders, and reduce the amount of time to perform a route lookup, and can therefore advantageously provide lower cost and faster SAS networks.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

Embodiments of the invention eliminate the need for a large address table by attaching labels to the OPEN frame and applying label switched routing to SAS expanders. A forward label stack of egress port labels is inserted into a forward OPEN frame by firmware in the initiator, prior to the forward OPEN frame being transmitted to a SAS expander. Each egress port label identifies the egress port for a SAS expander in the transmit or forward path. Each SAS expander to be participating in the connection will read the egress port labels in the forward OPEN frames to determine the egress port to connect to, and through which data is to be sent. The SAS expander marks the egress port label invalid or discards it and forwards the OPEN frame to the egress port, where the next SAS expander will receive the forward OPEN frame and look for the first valid label to continue the routing. The process repeats until the forward OPEN frame reaches an edge or target device, at which time any remaining egress port labels are discarded and the OPEN frame is forwarded to the end device.

This scheme suits SAS particularly well, because SAS initiators are aware of the topology through the SAS discovery process. As such, the initiator can create a table of egress port labels identifying the network path to each device in the system. When an initiator wishes to establish a circuit or connection to a device, it inserts the egress port label stack into the OPEN frame. This requires very little overhead in a SAS initiator because it already maintains all necessary information.

Embodiments of invention eliminate the need for extensive CAMs or lookup tables, reduce routing resources required for SAS expanders, and reduce the amount of time to perform a route lookup, and can therefore advantageously provide lower cost and faster SAS networks.

Although embodiments of the invention may be described herein primarily in terms of SAS devices, it should be understood that embodiments of the invention are not so limited, but extend to other compatible devices such as Serial Advanced Technology Attachment (SATA) devices, which can connect to SAS expanders through a special port known as a SATA Tunneling Protocol (STP) port.

Suppose that FIG. 1 illustrates an exemplary SAS-2 network in which all SAS expanders 106, 108, 110 and 112 are fanout SAS expanders. Further suppose that initiator 102 wants to send data to drive 122. Three labels will be needed, because three SAS expanders 106, 108 and 110 are in the path between initiator 102 and device 122. To connect initiator 102 to device 122, the connection will have to pass through egress port 128 having a label of Z on SAS expander 106, egress port 136 having a label of V on SAS expander 108, and egress port 138 having a label of Y on SAS expander 110. Thus, the labels Z, V and Y are inserted by firmware in initiator 102 into the forward OPEN frame.

Figure 2:
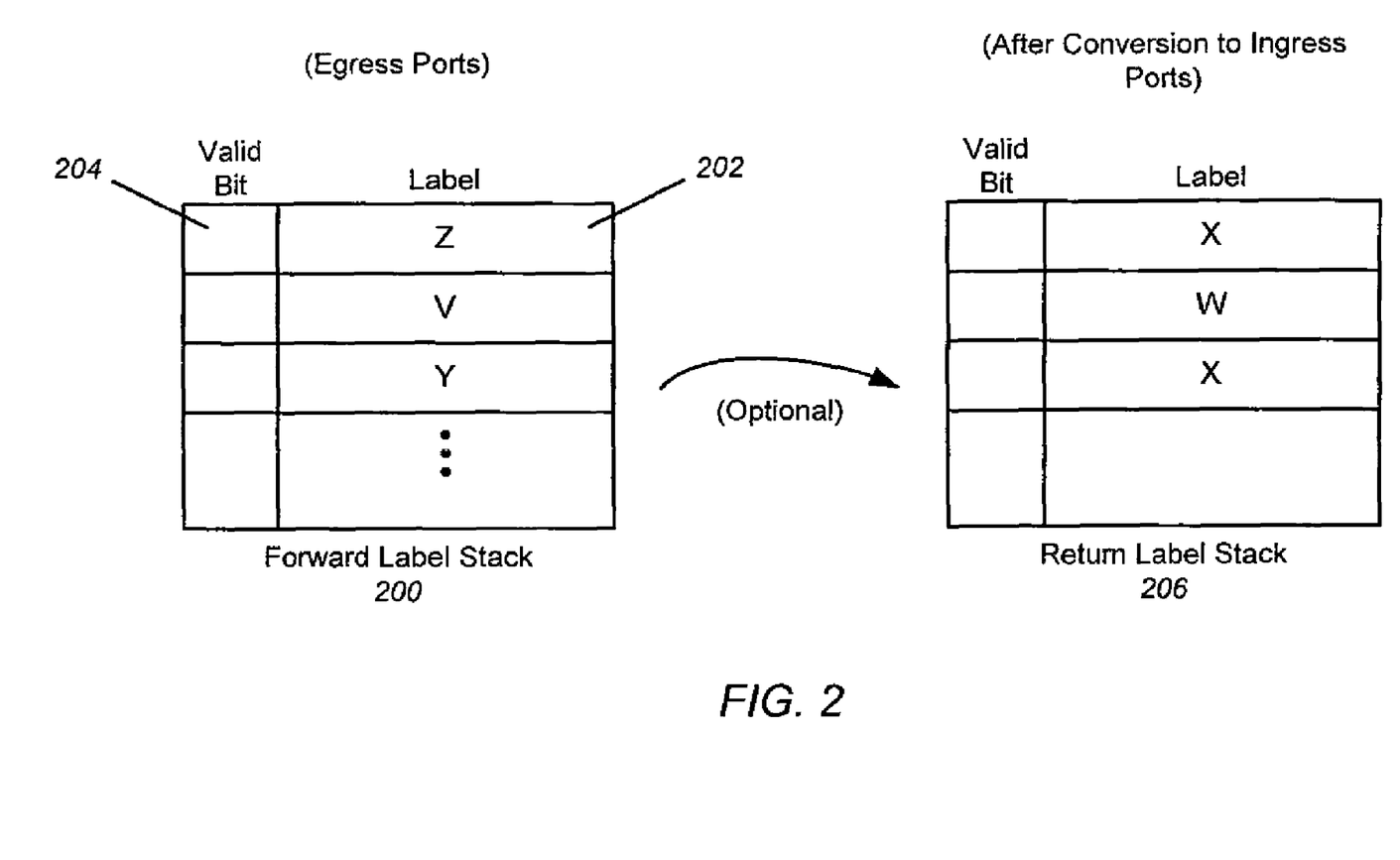
FIG. 2 is a representation of an exemplary stack of labels that may be inserted into an OPEN frame in a SAS-2 network according to embodiments of the invention.

FIG. 2 is a representation of an exemplary forward label stack 200 that may be inserted into a forward OPEN frame in a SAS-2 network according to embodiments of the invention. Label stack 200 could be an arbitrary length, but a practical limit may be thirty-two. Note that initiator 102 is aware of the proper egress ports for each SAS expander because it learned the configuration of the system during initialization, when it discovered all of the devices in the system. In the example of FIGS. 1 and 2, when SAS expander 106 receives the OPEN frame from initiator 102, it looks at the first valid egress port label 202 in stack 200, as determined by valid bit 204, extracts the label Z identifying egress port 128, then either marks the valid bit for that label as invalid or pops the stack of labels to discard the label Z. Note that this reading of the label stack, extracting the proper label, and marking the label invalid or popping the stack can be performed by one or more processors in the SAS expander under control of firmware or software, dedicated logic, or a combination of both, collectively referred to herein as label switching logic.

SAS expander 106 then sends out the OPEN frame over an available connection on port 128 as determined by port module 126. When SAS expander 108 receives the OPEN frame, it also looks at the first valid label in the table (in this example, label V identifying port 136), marks it as invalid or pops the stack, and sends the OPEN frame out on port 136. When SAS expander 110 receives the OPEN frame, it also looks at the first valid label in the table (in this example, label Y identifying port 138), marks it as invalid or pops the stack, and sends the OPEN frame out on port 138 to device 122. Note that before SAS expander 110 sends the OPEN frame to device 122, it must first remove any remaining labels from the OPEN frame because the device may not know how to read the OPEN frame with this extra embedded label information.

Next, device 122 must send a return OPEN frame back to initiator 102. However, target devices such as hard disk drives are not aware of the topology and hence would not be expected to maintain a table of label stacks. Therefore, after receiving the forward OPEN frame from initiator 102, device 122 responds in the only way it knows how, by sending a regular return OPEN frame to SAS expander 110. (Note that the connection is established once the destination receives the OPEN frame and returns an OPEN ACCEPT. The connection between initiator 102 and device 122 is now established and the initiator may send frames to the device. When initiator 102 has completed sending frames it will "tear down" the connection by sending a CLOSE. When device 122 needs to return data to initiator 102, in response to a command received from the initiator, it will now need to establish a new connection to the initiator by sending an OPEN frame where the attached expander will insert the reverse label stack.)

Because there are typically many fewer initiators, perhaps 16 or less, than target devices, SAS expanders which are attached to target device can maintain a small table of label stacks identifying the path to each initiator. Thus, when return OPEN frames are received from an edge device, the destination address is used to select the return label stack identifying the path to the initiator. Accordingly, in the example of FIGS. 1 and 2, after receiving a return OPEN frame from device 122, SAS expander 110 must construct the return label stack and embed it into the OPEN frame before sending it along to the next. SAS expander 108. This construction of the return label stack can be performed by the label switching logic. To construct the return label stack, SAS expander 110 may maintain a small table with ingress ports that lead back to initiator 102.

Several methods may be used to create the small table referred to above according to embodiments of the invention. One embodiment makes use of the fact that the SAS expanders initially query the system to discover all attached devices. If an attached device is found to be another SAS expander, that expander is sent a request for information. In the example of FIG. 1, SAS expander 110 will discover that SAS expander 108 is attached, and will send a request to SAS expander 108 for information on its attached devices. SAS expander 108, on the other hand, will query SAS expander 106 to discover its attached devices. In this manner, SAS expander 110 will eventually receive information on the configuration of the system, and can construct the small table accordingly. The table is small because the number of initiators in the system is much smaller than the number of targets and it is only necessary to maintain the reverse label path to the initiators.

Figure 3:
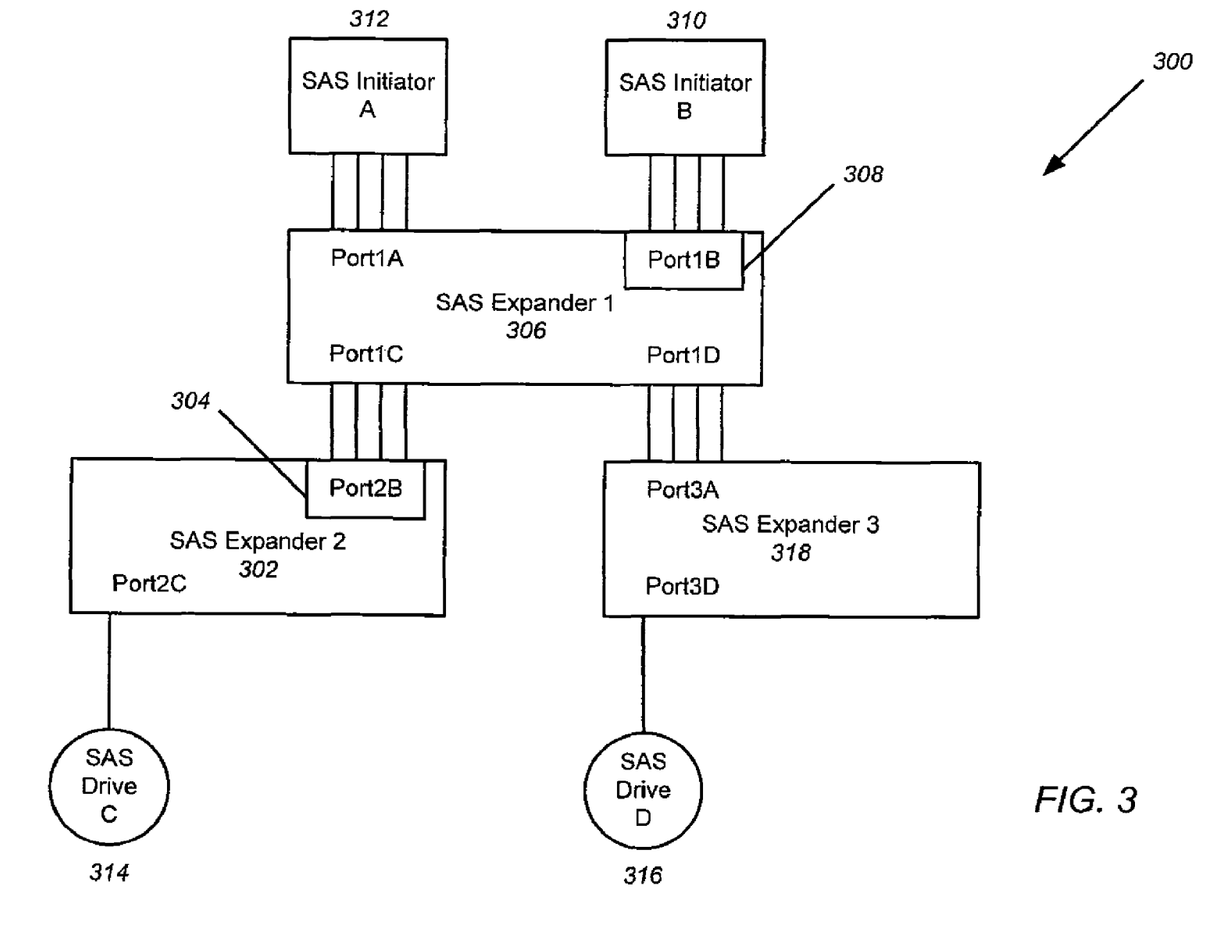
FIG. 3 illustrates an exemplary network in which the SAS expanders query other SAS expanders as described above to generate a return label stack according to embodiments of the invention.

FIG. 3 illustrates an exemplary network 300 in which the SAS expanders query other SAS expanders as described above to generate a return label stack according to embodiments of the invention. Once the presence of an initiator is detected by a SAS expander via the reception of a Port Login (PLOGI) frame, the address of the initiator could be saved for use in querying other SAS expanders in the system to determine the port to which the initiator is connected. For example, in the example of FIG. 3, if SAS expander 302 detects initiator 310 through port 304, it would query SAS expander 306 attached to port 304, seeking to determine the port to which the initiator was connected. SAS expander 306 would reply with port 308 as the answer. SAS expander 302 would make queries for every initiator it detected and would query as many SAS expanders as necessary to learn the path from SAS expander 302 to the initiator. SAS expander 302 would build the return path labels form the information gathered, and store it for later use.

In another embodiment, the ingress port information is obtained when the OPEN frame is initially forwarded from initiator 102 to device 122. In this approach, the ingress ports are noted and saved as the SAS expanders are traversed. In one embodiment, as an OPEN frame is received by a SAS expander, the egress port label is replaced by the ingress or source port label for that SAS expander, and marks the label as a return or ingress port label. Thus, in the example of FIGS. 1 and 2, after SAS expander 106 reads label Z from label stack 200, ingress port X is stored instead. This process is repeated for each SAS expander, except for the final SAS expander which determines if the frame was a PLOGI from an initiator. If it was, it stores the return path label stack for later use. In the present example, by the time the OPEN frame has been received and modified by SAS expander 110, label stack 200 now contains return labels X, W, and X. This label information can then be saved in a small table in SAS expander 110 before it is removed from the OPEN frame prior to transmission to device 122. During the return path, the labels in the small table in SAS expander 110 can be used to insert a label stack back into the OPEN frame before it is sent back to SAS expander 108.

In either of the methodologies described above, having the SAS expander create the return path ensures that the solution will work with SATA via STP ports as well as SAS.

A specific example utilizing FIG. 3 will now be presented. In FIG. 3, SAS Initiator 312 would have the following label stacks for SAS Drive 314 and SAS Drive 316:

| SAS Expander | |
| --- | --- |
| | Label Stack from 312 to 314 |
| 306 | Port1C |

| SAS Expander | |
| --- | --- |
| 302 | Port2C |
| | Label Stack from 312 to 316 |
| 306 | Port1D |
| 314 | Port3D |

The reverse path labels from SAS drives 314 and 316 to SAS initiator 312 are:

| Expander | |
| --- | --- |
| | Label Stack from 314 to 312 |
| 302 | Port2B |
| 306 | Port1A |
| | Label Stack from 316 to 312 |
| 314 | Port3A |
| 306 | Port1B |

The paths from SAS initiator 310 to SAS drives 314 and 316 are similarly constructed.

When SAS initiator 312 wishes to establish a circuit to SAS drive 314, it selects the appropriate label stack and pretends it to the OPEN frame. SAS expander 306 receives the frame on its Port1A and examines the first valid label, which in this case identifies Port1C as the destination port. SAS expander 306 marks the label invalid and forwards the OPEN frame to its Port1C. SAS expander 302 then receives the frame and in turn examines the first valid label. In this case it identifies Port2C as the destination. Because Port2C is attached to end device 314, as opposed to another SAS expander, it removes all of the labels from the OPEN frame, recalculates the CRC and forwards it to the destination Port2C where it is passed to SAS drive 314.

The return path works similarly, except the SAS expander inserts a return label stack into the OPEN frame as described above. Continuing the example of FIG. 3, when SAS Drive 314 wishes to send a frame to SAS initiator 312, SAS expander 302 would insert the label stack for SAS drive 314 to SAS initiator 312 as shown in the table above. From there, each SAS expander in the system would connect the circuit based on the received label stack.

It should be noted that if a SAS expander does not support label switching according to embodiments of the invention, the OPEN frames must be stripped of any label stack information before it can be sent to that SAS expander. For example, if SAS expander 112 in the example of FIG. 1 does not support label switching, then before an OPEN frame can be sent to SAS expander 112 from SAS expander 106, all label stack information must be removed from the OPEN frame. When SAS expander 112 sends an OPEN frame back to SAS expander 106, SAS expander 106 can then insert the label stack information for use at higher levels.

Figure 4:
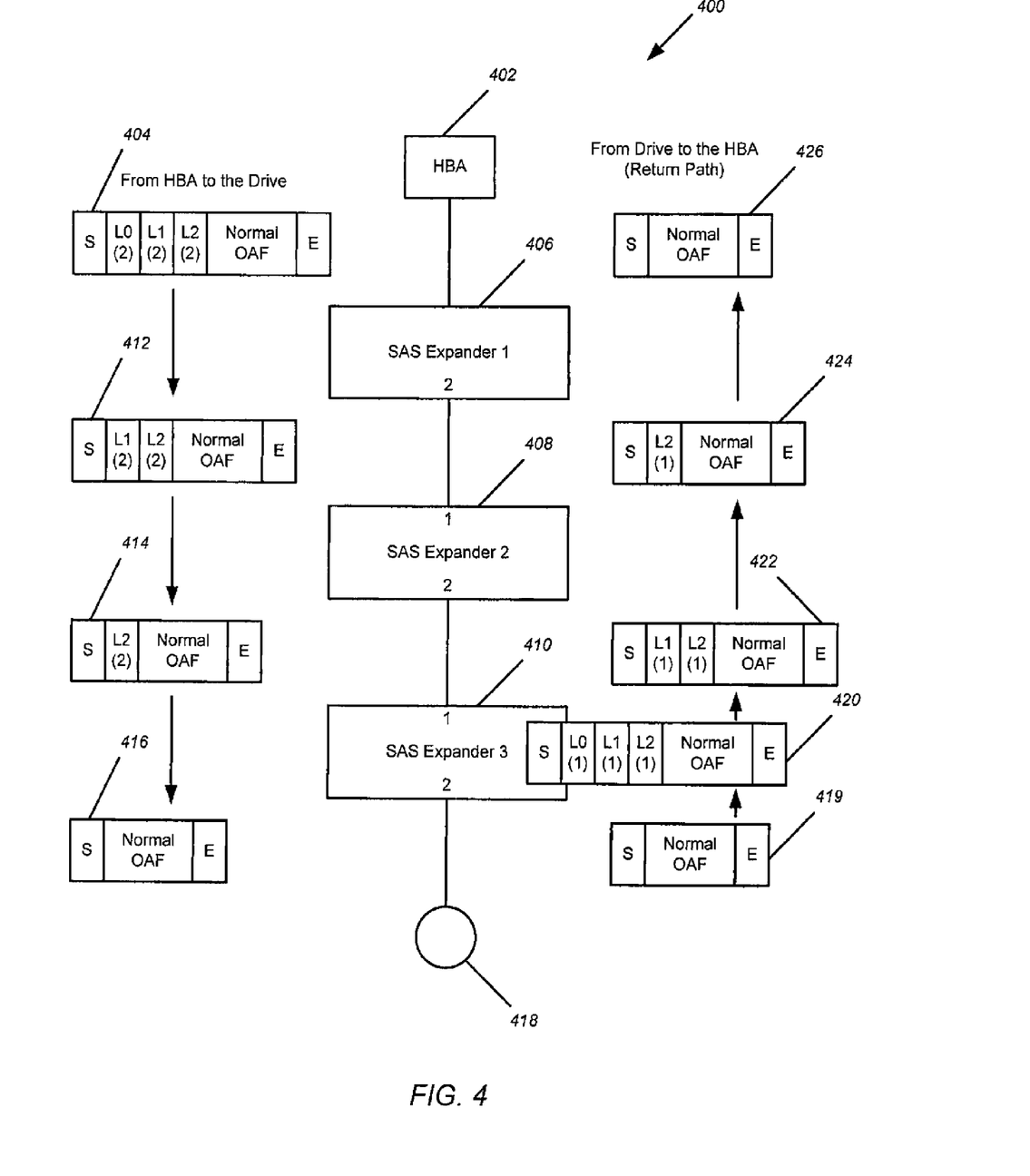
FIG. 4 illustrates an example of a label switched SAS network that discards labels after they are used according to embodiments of the invention.

FIG. 4 illustrates an example of a label switched SAS network 400 that discards labels after they are used according to embodiments of the invention. FIG. 4 shows the label stack on an Open Address Frame (OPEN frame) as it progresses through the system. At each "hop," the label at the top of the stack is discarded before the SAS expander forwards the frame to the next device. In particular, in FIG. 4 initiator or host bus adapter (HBA) 402 sends an OPEN frame 404 to SAS expander 406. OPEN frame 404 includes a start of frame field (S), an end of frame field (E), the normal contents of the open address frame (OAF), and a label stack with three label fields, L0, L1 and L2. Because each of the egress ports for SAS expanders 406, 408 and 410 have a label of "2", each of the label fields L0, L1 and L2 contain a label of 2. These egress ports were known to initiator 402 after it performed discovery of the network.

After SAS expander 406 reads the first valid label field L0 from the stack and determines that the egress port has a label of 2, the label is discarded. SAS expander 406 then sends OPEN frame 412 to SAS expander 408. After SAS expander 408 reads the first valid label field L1 from the stack and determines that the egress port has a label of 2, the label is discarded. SAS expander 408 then sends OPEN frame 414 to SAS expander 410. After SAS expander 410 reads the first valid label field L2 from the stack and determines that the egress port has a label of 2, the label is discarded. SAS expander 410 then sends OPEN frame 416 to device 418. Note that because the entire label stack has been discarded, OPEN frame 416 is in the conventional format, which is advantageous because device 418 may not know how to interpret an OPEN frame containing a label stack.

As mentioned above, target device 418 is not aware of the topology and hence cannot maintain a table of label stacks. Therefore, after receiving OPEN frame 416 from SAS expander 410, device 418 responds by sending a regular OPEN frame 419 to SAS expander 410. SAS expander 410 has stored the ingress ports in a small table, which were known from its discovery of other SAS expanders, so SAS expander 410 utilizes the small table to insert a return label stack into OPEN frame 420. OPEN frame 420 includes a start of frame field (S), an end of frame field (E), the normal contents of the open address frame (OAF), and a label stack with three label fields, L0, L1 and L2. Because each of the ingress ports for SAS expanders 406, 408 and 410 have a label of "1", each of the label fields L0, L1 and L2 contain a label of 1.

After SAS expander 410 reads the first valid label field L0 from the stack and determines that the ingress port has a label of 1, the label is discarded. SAS expander 410 then sends OPEN frame 422 to SAS expander 408. After SAS expander 408 reads the first valid label field L1 from the stack and determines that the ingress port has a label of 1, the label is discarded. SAS expander 408 then sends OPEN frame 424 to SAS expander 406. After SAS expander 406 reads the first valid label field L2 from the stack and determines that the ingress port has a label of 1, the label is discarded. SAS expander 406 then sends OPEN frame 426 to initiator 402.

Figure 5:
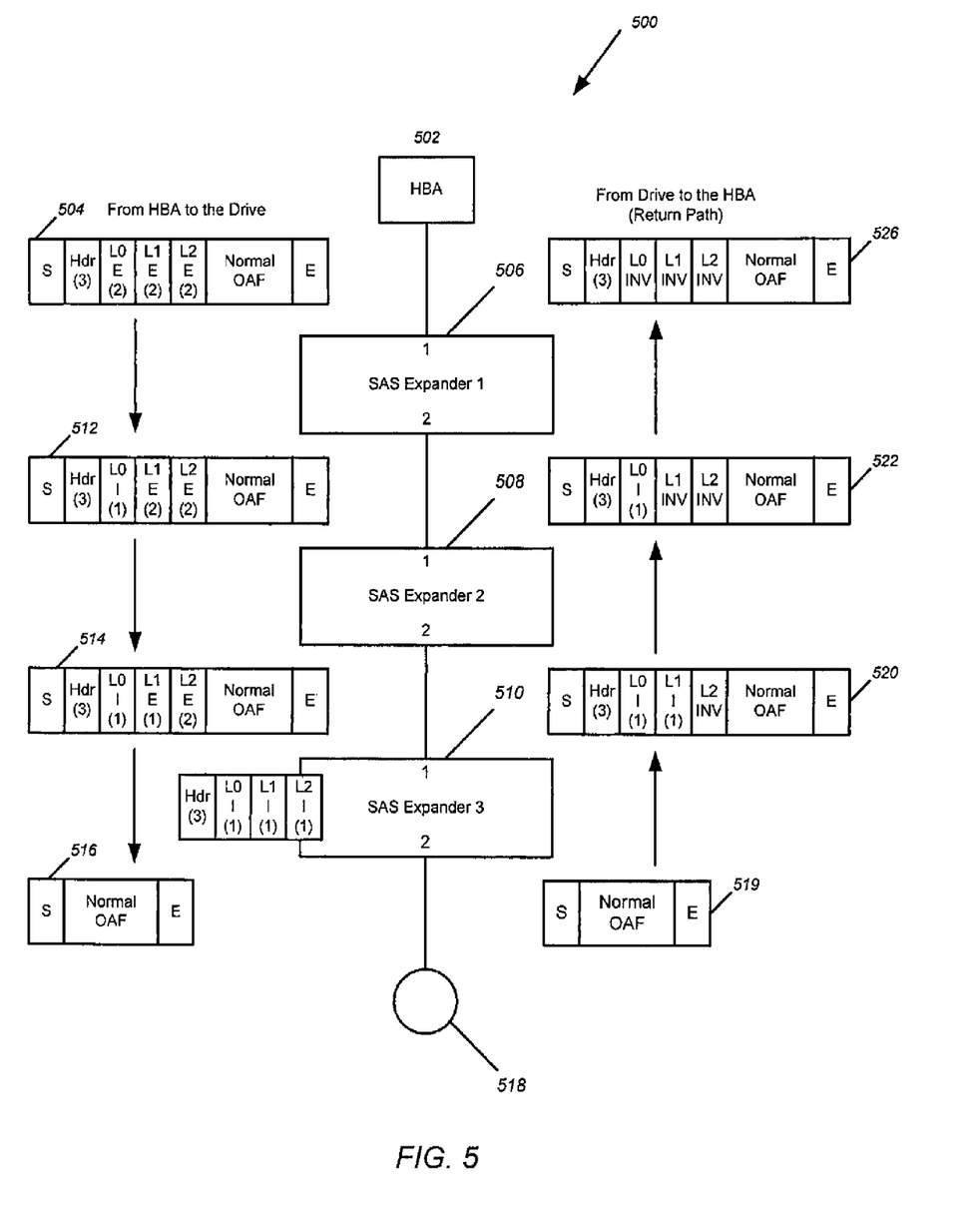
FIG. 5 illustrates an example of a label switched SAS network that retains labels after they are used and replaces egress labels with return or ingress labels according to embodiments of the invention.

FIG. 5 illustrates an example of a label switched SAS network 500 that retains labels after they are used and replaces egress labels with return or ingress labels according to embodiments of the invention. On the out path from an initiator to a target the label is marked as an egress label. Each SAS expander in the system replaces its label with an ingress path label before forwarding the frame to the next device. The label stack is retained by the edge switch or SAS expander and is stripped from the frame before forwarding the frame to a target device. On the return path from target to initiator the labels are now all marked as ingress labels. Each SAS expander now uses the ingress label to identify the egress port and then marks the label invalid before forwarding the frame.

FIG. 5 shows the label stack on an Open Address Frame (OPEN frame) as it progresses through the system. At each "hop," the egress port label at the top of the stack is replaced with an ingress port label before the SAS expander forwards the frame to the next device. In particular, in FIG. 5 initiator or host bus adapter (HBA) 502 sends an OPEN frame 504 to SAS expander 506. OPEN frame 504 includes a start of frame field (S), header field (Hdr), an end of frame field (E), the normal contents of the open address frame (OAF), and a label stack with three label fields, L0, L1 and L2. Because each of the egress ports for SAS expanders 506, 508 and 510 have a label of "2", each of the label fields L0, L1 and L2 contain a label of 2 and are identified with an "E" for egress port. These egress ports were known to initiator 502 after it performed discovery of the network.

After SAS expander 506 reads the first valid egress label field L0 from the stack and determines that the egress port has a label of 2, the label is replaced with the ingress port identifier (I) and a label of "1", because the port associated with label 1 is where the OPEN frame 504 entered the SAS expander. SAS expander 506 then sends OPEN frame 512 to SAS expander 508. After SAS expander 508 reads the first valid egress label field L1 from the stack and determines that the egress port has a label of 2, the label is replaced with the ingress port identifier (I) and a label of "1", because the port associated with label 1 is where the OPEN frame 512 entered the SAS expander. SAS expander 508 then sends OPEN frame 514 to SAS expander 510. After SAS expander 510 reads the first valid egress label field L2 from the stack and determines that the egress port has a label of 2, the label is replaced with the ingress port identifier (I) and a label of "1", because the port associated with label 1 is where the OPEN frame 514 entered the SAS expander. SAS expander 510 then removes and stores the header and label stack from OPEN frame 514, and then sends OPEN frame 516 to device 518. Note that because the entire label stack has been discarded, OPEN frame 516 is in the conventional format, which is advantageous because device 518 may not know how to interpret an OPEN frame containing a label stack.

As mentioned above, target device 518 is not aware of the topology and hence cannot maintain a table of label stacks. Therefore, after receiving OPEN frame 516 from SAS expander 510, device 518 responds by sending a regular OPEN frame 519 to SAS expander 510. SAS expander 510 has stored the ingress ports in a small table, so SAS expander 510 utilizes the small table to insert a return label stack into OPEN frame 519, creating OPEN frame 520. OPEN frame 520 includes a start of frame field (S), a header field (Hdr), an end of frame field (E), the normal contents of the open address frame (OAF), and a label stack with three label fields, L0, L1 and L2. Because each of the ingress ports for SAS expanders 506, 508 and 510 have a label of "1", each of the label fields L0, L1 and L2 contain a label of 1, and are marked as ingress port identifiers (I).

After SAS expander 510 reads the first valid label field L2 from the label stack (read in reverse order as compared to the forward path) and determines that the ingress port has a label of 1, the label identifier for field L2 is changed from ingress port (I) to invalid port (INV). SAS expander 510 then sends OPEN frame 520 to SAS expander 508. After SAS expander 508 reads the first valid label field L1 from the stack and determines that the ingress port has a label of 1, the label identifier for field L1 is changed from I to INV. SAS expander 508 then sends OPEN frame 522 to SAS expander 506. After SAS expander 506 reads the first valid label field L0 from the stack and determines that the ingress port has a label of 1, the label is discarded. SAS expander 506 then sends OPEN frame 526 to initiator 502.

Figure 6A:
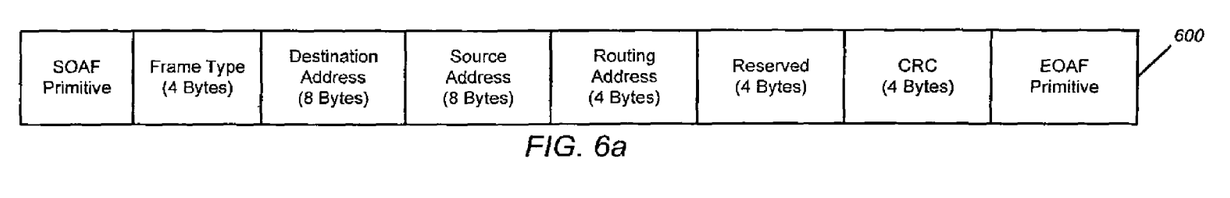
FIG. 6a illustrates a conventional SAS open address frame.
Figure 6B:
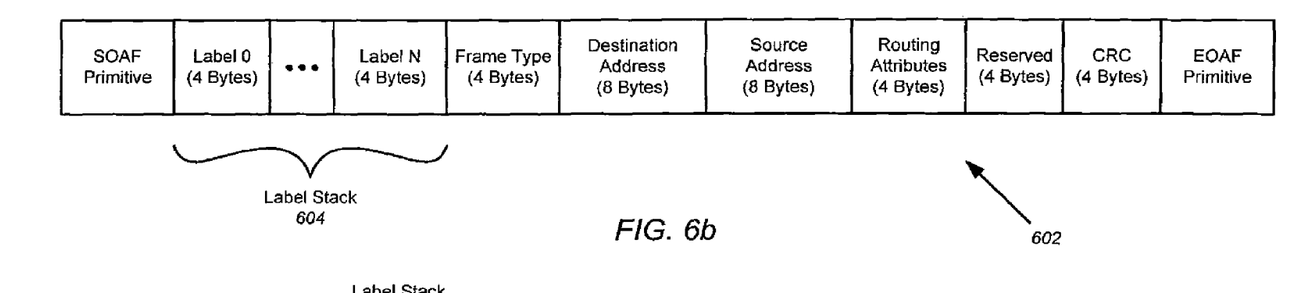
FIGS. 6b and 6c illustrate exemplary SAS open address frames according to embodiments of the invention.
Figure 6C:
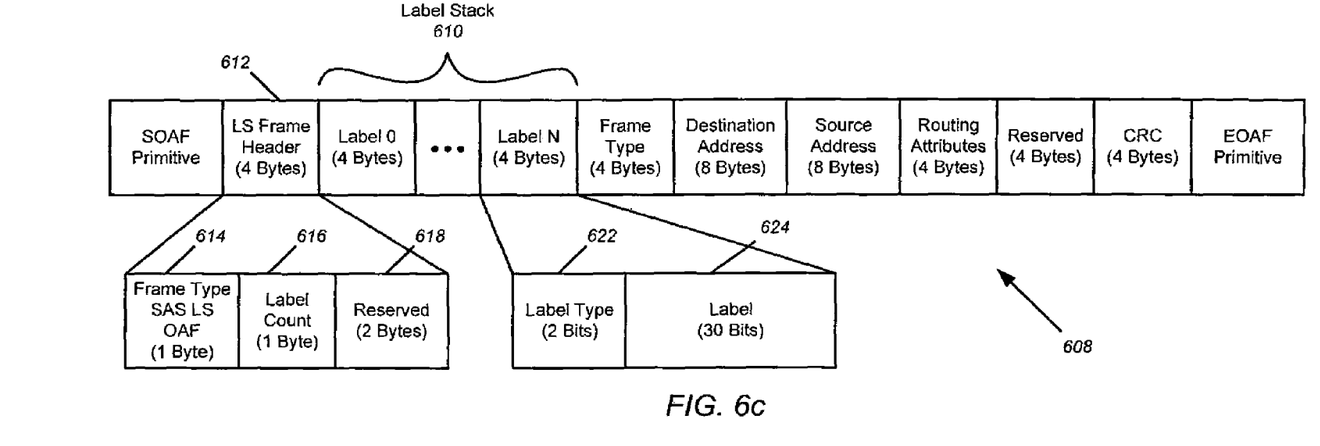

FIG. 6a illustrates a conventional SAS open address frame, and FIGS. 6b and 6c illustrate exemplary SAS open address frames according to embodiments of the invention. FIG. 6a illustrates an exemplary conventional SAS open address frame 600 without a label stack.

FIG. 6b illustrates an exemplary SAS open address frame 602 including label stack 604 in which labels are discarded as they are used. In addition to the egress port identifier, a label could contain other information pertaining to the connection, such as the priority of the connection.

FIG. 6c illustrates an exemplary SAS open address frame 606 including label stack 608 in which egress port labels are replaced with ingress port labels, and label stack frame header 612. Label stack frame header 612 can include a frame type SAS label stack open address frame byte 614 that indicates that the frame is a label switches open address frame, a label count byte 616 that provides a count of the number of labels in the stack, and reserved bytes 618. Each label 620 in label stack 610 can include a label type 622 (i.e. invalid label, egress label, ingress label, or reserved) and a label 624. Label 624 could directly indicate the ingress or egress port in addition to other information.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A Serial Attached SCSI (SAS) expander, comprising:
   a plurality of ports; and
   label switching logic for assisting in establishing a connection between an initiator and a target device, the label switching logic having one or more processors configured for
   receiving a forward OPEN frame containing a forward label stack of egress port labels for a forward path from the initiator to the target device through one or more SAS expanders,
   identifying a first valid egress port label in the forward label stack,
   altering the forward label stack to account for the identification of the first valid egress port label, and
   routing the forward OPEN frame including the altered forward label stack to an egress port associated with the first valid egress port label.

2. The SAS expander of claim 1, wherein altering the forward label stack comprises changing the first valid egress port label to an invalid state after reading the first valid egress port label.

3. The SAS expander of claim 1, wherein altering the forward label stack comprises popping the first valid egress port label off of the forward label stack after reading the first valid egress port label.

4. The SAS expander of claim 1, wherein altering the forward label stack comprises removing the forward label stack from the forward OPEN frame if a target device is connected to the egress port associated with the first valid egress label.

5. The SAS expander of claim 1, further comprising a table for storing ingress port labels, wherein the one or more processors of the label switching logic are further configured for:
   receiving a return OPEN frame for a return path from the target device;
   constructing a return label stack from the ingress port labels stored in the table;
   identifying a first valid ingress port label in the return label stack; and
   routing the return OPEN frame including the return label stack to an ingress port associated with the first valid ingress port label.

6. The SAS expander of claim 5, wherein the ingress port labels are determined during a discovery process performed by the SAS expander.

7. The SAS expander of claim 5, wherein the ingress port labels stored in the table are determined through a process comprising:
   at each of the SAS expanders that receives the forward OPEN frame, altering the forward label stack after identifying the first valid egress port label by replacing the first valid egress port label with an ingress port label associated with an ingress port through which the forward OPEN frame was received.

8. The SAS expander of claim 1, wherein the one or more processors of the label switching logic are further configured for:
   receiving a return OPEN frame containing a return label stack of ingress port labels for a return path from the target device to the initiator;
   identifying a first valid ingress port label in the return label stack;
   altering the return label stack to account for the identification of the first valid ingress port label; and
   routing the return OPEN frame including the altered return label stack to an ingress port associated with the first valid ingress port label.

9. The SAS expander of claim 8, wherein altering the return label stack comprises changing the first valid ingress port label to an invalid state after reading the first valid ingress port label.

10. The SAS expander of claim 8, wherein altering the return label stack comprises popping the first valid ingress port label off of the return label stack after reading the first valid ingress port label.

11. The SAS expander of claim 8, wherein altering the return label stack comprises removing the return label stack from the return OPEN frame if the initiator is connected to the ingress port associated with the first valid ingress label.

12. The SAS expander of claim 1, wherein the SAS expander is integrated in a server.

13. The SAS expander of claim 1, wherein the SAS expander is integrated in a storage network.

14. An initiator for establishing a connection between the initiator and a target device through one or more Serial Attached SCSI (SAS) expanders within a storage network, the initiator comprising:
   a plurality of ports; and
   a processor programmed for
   determining egress ports for all SAS expanders in a forward path from the initiator to the target device during a discovery process,
   constructing a forward label stack based upon the determined egress ports,
   inserting the forward label stack into a forward OPEN frame, and
   transmitting the forward OPEN frame to a first SAS expander in the forward path.

15. A method for assisting in establishing a connection between an initiator and a target device through one or more Serial Attached SCSI (SAS) expanders, the method comprising:
   receiving a forward OPEN frame at a Serial Attached SCSI (SAS) expander, the forward OPEN frame containing a forward label stack of egress port labels for a forward path from the initiator to the target device;
   identifying a first valid egress port label in the forward label stack;

altering the forward label stack to account for the identification of the first valid egress port label; and
routing the forward OPEN frame including the altered forward label stack to an egress port associated with the first valid egress port label.

16. The method of claim 15, wherein altering the forward label stack comprises changing the first valid egress port label to an invalid state after reading the first valid egress port label.

17. The method of claim 15, wherein altering the forward label stack comprises popping the first valid egress port label off of the forward label stack after reading the first valid egress port label.

18. The method of claim 15, wherein altering the forward label stack comprises removing the forward label stack from the forward OPEN frame if a target device is connected to the egress port associated with the first valid egress label.

19. The method of claim 15, further comprising:
receiving a return OPEN frame at the SAS expander for a return path from the target device;
constructing a return label stack from ingress port labels stored in a table in the SAS expander;
identifying a first valid ingress port label in the return label stack; and
routing the return OPEN frame including the return label stack to an ingress port associated with the first valid ingress port label.

20. The method of claim 19, further comprising determining the ingress port labels during a SAS expander discovery process.

21. The method of claim 19, wherein the ingress port labels stored in the table are determined through a process comprising:
at each of the SAS expanders that receives the forward OPEN frame, altering the forward label stack after identifying the first valid egress port label by replacing the first valid egress port label with an ingress port label associated with an ingress port through which the forward OPEN frame was received.

22. The method of claim 15, further comprising:
receiving a return OPEN frame at the SAS expander containing a return label stack of ingress port labels for a return path from the target device to the initiator;
identifying a first valid ingress port label in the return label stack;
altering the return label stack to account for the identification of the first valid ingress port label; and
routing the return OPEN frame including the altered return label stack to an ingress port associated with the first valid ingress port label.

23. The method of claim 22, wherein altering the return label stack comprises changing the first valid ingress port label to an invalid state after reading the first valid ingress port label.

24. The method of claim 22, wherein altering the return label stack comprises popping the first valid ingress port label off of the return label stack after reading the first valid ingress port label.

25. The method of claim 22, wherein altering the return label stack comprises removing the return label stack from the return OPEN frame if the initiator is connected to the ingress port associated with the first valid ingress label.

26. A method performed by an initiator for establishing a connection between the initiator and a target device through one or more Serial Attached SCSI (SAS) expanders, the method comprising:
determining egress ports for all SAS expanders in a forward path from the initiator to the target device during a discovery process;
constructing a forward label stack based upon the determined egress ports;
inserting the forward label stack into a forward OPEN frame; and
transmitting the forward OPEN frame to a first SAS expander in the forward path.

27. A non-transitory computer-readable medium comprising processor-executable program code for assisting in establishing a connection between an initiator and a target device through one or more Serial Attached SCSI (SAS) expanders in a storage network, the program code, while executed, causing one or more processors to perform a method comprising:
receiving a forward OPEN frame at a Serial Attached SCSI (SAS) expander, the forward OPEN frame containing a forward label stack of egress port labels for a forward path from the initiator to the target device;
identifying a first valid egress port label in the forward label stack;
altering the forward label stack to account for the identification of the first valid egress port label; and
routing the forward OPEN frame including the altered forward label stack to an egress port associated with the first valid egress port label.

28. The non-transitory computer-readable medium of claim 27, wherein altering the forward label stack comprises changing the first valid egress port label to an invalid state after reading the first valid egress port label.

29. The non-transitory computer-readable medium of claim 27, wherein altering the forward label stack comprises popping the first valid egress port label off of the forward label stack after reading the first valid egress port label.

30. The non-transitory computer-readable medium of claim 27, wherein altering the forward label stack comprises removing the forward label stack from the forward OPEN frame if a target device is connected to the egress port associated with the first valid egress label.

31. The non-transitory computer-readable medium of claim 27, wherein the program code, while executed, further causes the one or more processors to perform:
receiving a return OPEN frame at the SAS expander for a return path from the target device;
constructing a return label stack from ingress port labels stored in the SAS expander;
identifying a first valid ingress port label in the return label stack; and
routing the return OPEN frame including the return label stack to an ingress port associated with the first valid ingress port label.

32. The non-transitory computer-readable medium of claim 31, wherein the program code, while executed, further causes the one or more processors to perform determining the ingress port labels during a SAS expander discovery process.

33. The non-transitory computer-readable medium of claim 31, wherein the ingress port labels stored in the SAS expander are determined by:
at each of the SAS expanders that receives the forward OPEN frame, altering the forward label stack after identifying the first valid egress port label by replacing the first valid egress port label with an ingress port label associated with an ingress port through which the forward OPEN frame was received.

34. The non-transitory computer-readable medium of claim 27, wherein the program code, while executed, further causes the one or more processors to perform:

receiving a return OPEN frame at the SAS expander containing a return label stack of ingress port labels for a return path from the target device to the initiator;
identifying a first valid ingress port label in the return label stack;
altering the return label stack to account for the identification of the first valid ingress port label; and
routing the return OPEN frame including the altered return label stack to an ingress port associated with the first valid ingress port label.

35. The non-transitory computer-readable medium of claim 34, wherein altering the return label stack comprises changing the first valid ingress port label to an invalid state after reading the first valid ingress port label.

36. The non-transitory computer-readable medium of claim 34, wherein altering the return label stack comprises popping the first valid ingress port label off of the return label stack after reading the first valid ingress port label.

37. The non-transitory computer-readable medium of claim 34, wherein altering the return label stack comprises removing the return label stack from the return OPEN frame if the initiator is connected to the ingress port associated with the first valid ingress label.

38. A non-transitory computer-readable medium within an initiator comprising processor-executable program code for establishing a connection between the initiator and a target device through one or more Serial Attached SCSI (SAS) expanders, the program code, while executed, causing one or more processors to perform a method comprising:
determining egress ports for all SAS expanders in a forward path from the initiator to the target device during a discovery process;
constructing a forward label stack based on the determined egress ports;
inserting the forward label stack into a forward OPEN frame; and
transmitting the forward OPEN frame to a first SAS expander in the forward path.

\* \* \* \* \*